United States Patent [19]
Wu

[11] Patent Number: 5,722,606
[45] Date of Patent: Mar. 3, 1998

[54] PEPPER GRINDER

[75] Inventor: Hua-Te Wu, Tainan, Taiwan

[73] Assignee: Yienn Lih Enterprises Co., Ltd., Tainan, Taiwan

[21] Appl. No.: 743,234

[22] Filed: Nov. 5, 1996

[51] Int. Cl.$^6$ ............................................. A47J 42/04
[52] U.S. Cl. ............................................. 241/169.1
[58] Field of Search ............................ 222/142.1–142.7; 241/168, 169.1, 285.1, 285.2, 285.3

[56] References Cited

U.S. PATENT DOCUMENTS

| | | | |
|---|---|---|---|
| 3,758,253 | 9/1973 | Brilliant | 241/169.1 |
| 4,374,574 | 2/1983 | David | 241/169.1 |
| 5,082,190 | 1/1992 | Chen . | |

FOREIGN PATENT DOCUMENTS

| | | | |
|---|---|---|---|
| 2564721 | 11/1985 | France | 241/169.1 |
| 1438688 | 11/1988 | U.S.S.R. | 241/169.1 |

*Primary Examiner*—Mark Rosenbaum
*Attorney, Agent, or Firm*—Morton J. Rosenberg; David I. Klein; Jun Y. Lee

[57] ABSTRACT

An improvement in a pepper grinder. The pepper grinder comprises a housing element and a grinding mechanism housed inside the housing element. The improvement lies in a fixing element provided for fixing the grinding mechanism to the housing element, which fixing element has two opposing hooked portions each having a sloping part and a second part with an enlarged part. The grinding mechanism has two gaps narrower than the enlarged parts. The gaps engage upper ends of the second parts which are arranged just above the enlarged parts and the sloping parts are firmly abutted against an inner wall of the housing element whereby firmly fixing the grinding mechansim to the housing element.

2 Claims, 5 Drawing Sheets

PEPPER GRINDER

BACKGROUND OF THE INVENTION

A common pepper grinder, referring to FIG.7, comprises a cover 10, a housing element 20, a grinding mechanism 30, and a fixing element 40 as the main parts.

The housing element 20 is made of transparent materials and has a central through hole and an inner annular flange extending from the a middle of the central through hole. There are provided on a bottom side of said inner annular flange two opposing protrusions 201,201 each having a threaded hole 202 therein.

The grinding mechanism 30 comprises an outer wall 301 and an inner swiveling element 303 movably housed inside the outer wall 301 and rigidly anchored to a rod 302 having a threaded distal end. The outer wall 301 has an outward annular flange 304 with two opposing gaps 305.

The fixing element 40 has two opposing bent ends and each end has a hole 401. The fixing element 40 is shaped such that the bent ends thereof are at least wider than the gaps 305.

The cover 10 has a central hole 102 and a swiveling lever 103.

In combination, the grinding mechanism 30 is passed into the housing element 20 with the gaps 305 arranged around their corresponding protrusions 201. Then the fixing element 40 is mounted on the bottom of the grinding mechanism 30 with each threaded hole aligned with a corresponding one of the threaded holes 202 and the fixing element 40 is firmly secured to the protrusions 201 of the housing element 20 by means of screws 402 that are passed into the threaded holes 401 and 202. And at the same time, the outer wall 305 of the grinding element 30 is firmly fixed between the inner annular flange of the housing element 20 and the bent ends of the fixing element 40. Furthermore, the cover 10 is combined with the threaded distal end of the rod 302 from the central hole 102 thereof by means of a nut 301.

The nut 101 is also used to adjust the height of the swiveling element 303 relative to the outer wall 301 of the grinding mechanism 30.

In using the pepper grinder, pepper grains are put into the housing element 20 and the swiveling lever 303 is rotated such that the swiveling element 303 rotates relative to the outer wall 301 to grind pepper between both. Then, the ground pepper is dropped from between the swiveling element 303 and the outer wall 301 to the bottom of the housing element 20.

The above said tool provides a convenient way for grinding pepper, however, it is found that the protrusions 201 made of transparent materials are prone to be broken and that threads of the threads holes 202 are prone to be damaged if one should drive the screws 402 into the holes 202 too hard in assemblage.

Furthermore, it is necessary to use screw drivers for combining the fixing element 40 with the housing element 20, and so it is not considered a time-saving way for combining the same.

SUMMARY OF THE INVENTION

The present invention relates to an improvement in a pepper grinder. The pepper grinder mainly comprises a housing element and a grinding mechanism while the improvement mainly comprises a fixing element for fixing the grinding mechanism to the housing element.

The grinding mechanism has two opposing gaps on an outer wall thereof. The fixing element is bent to have two hooked portions. Each hooked portion includes a sloping part and a second part which has an enlarged part at least wider than the gaps. Each second part of the fixing element has an upper end received in a respective one of the gaps, while each enlarged part is abutted against the grinding mechanism adjacent to a respective one of the gaps when the fixing element is mounted to the grinding mechanism. The sloping parts firmly abut an inner wall of the housing element such that the fixing element is fixed to the housing element thereby fixing the outer wall of the grinding mechanism to the housing element. It can be understood that the subject fixing element for the pepper grinder has following advantages.

1. The mounting of the subject fixing element is more time-saving than that of the prior art fixing element.

2. The risk of the housing element getting broken or damaged is greatly reduced in terms of what would happen to the pepper grinder with the prior art fixing element.

BRIEF DESCRIPTION OF DRAWINGS

The invention will be better understood by reference to the accompanying drawings, wherein.

DESCRIPTION OF THE PREFERRED EMBODIMENTS

The present invention relates to an improvement in a pepper grinder; the pepper grinder mainly comprises a housing element 5 and a grinding mechanism 6, while the improvement mainly comprises a fixing element 7 for fixing the grinding mechanism 6 to the housing element 5.

Figure 1:
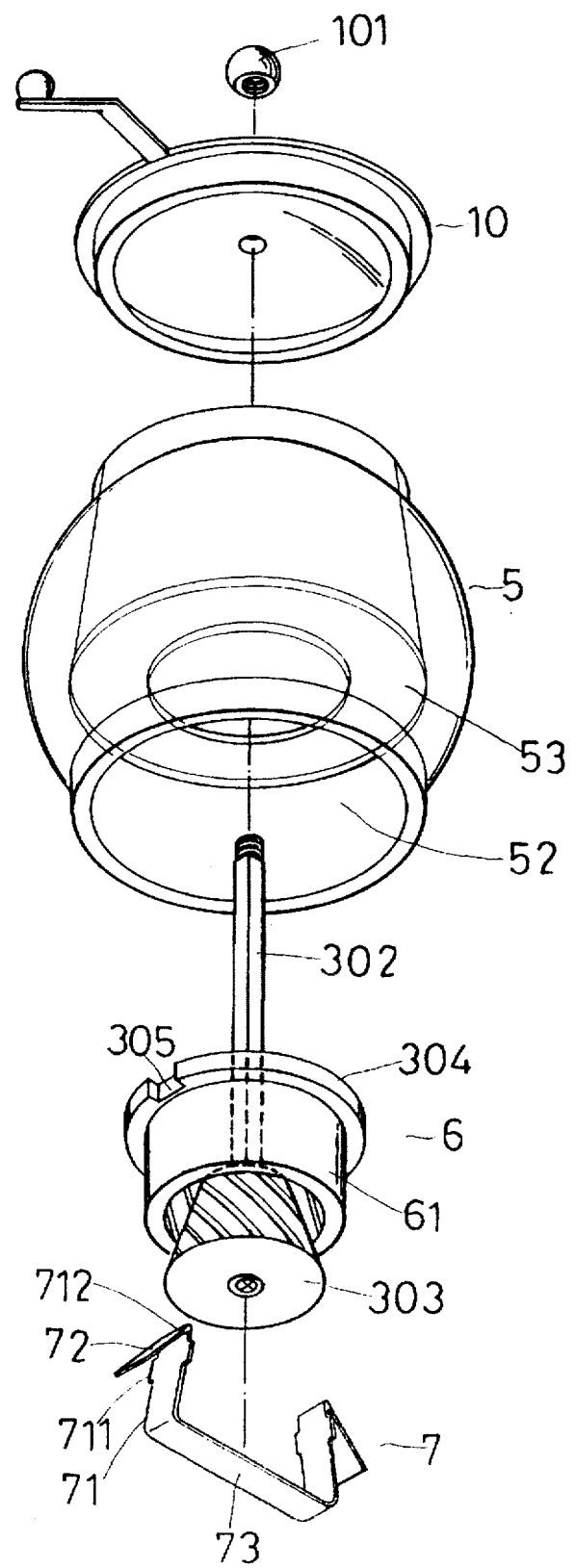
FIG. 1 is an exploded view of a pepper grinder with an improved fixing element according to the present invention.
Figure 2:
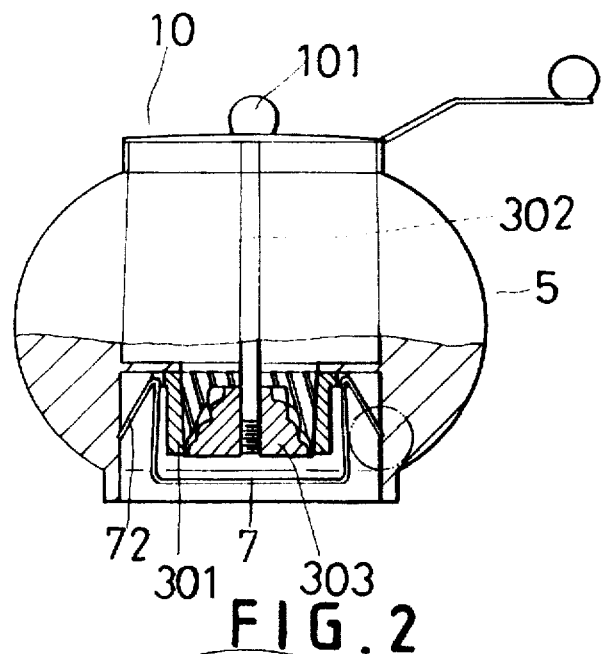
FIG. 2 is a cross-sectional view of a pepper grinder with an improved fixing element according to the present invention.
Figure 3:
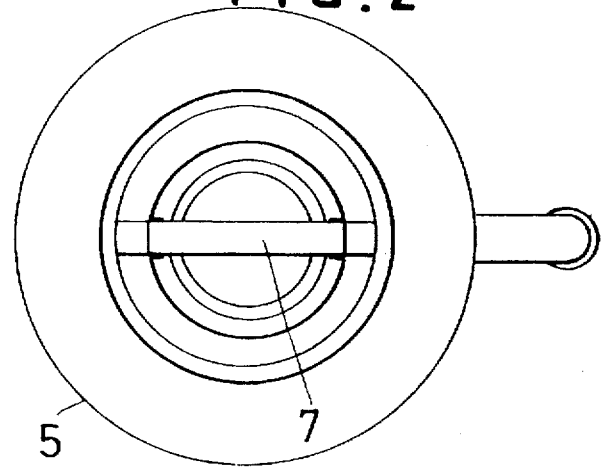
FIG. 3 is bottom view of a pepper grinder with an improved fixing element according to the present invention.

Referring to FIG. 1, the housing element 5 is transparent and has a central cavity 52 for holding the grinding mechanism 6; there is an inward annular flange 53 on the cavity 52 of the housing element 5. The grinding mechanism 6 comprises an outer wall 61, a swiveling element 303 received within the wall 61 and a rod 302 rigidly fixed to the swiveling element 303. The outer wall 61 has an outward annular flange 304 with two opposing gaps 305; the annular flange 304 is detained by the annular flange 53 of the housing element 5 when the grinding mechanism 6 is passed into the cavity 52 from a bottom of the housing element 5.

The fixing element 7 is bent to have two hooked portions at two opposing sides of the element 7. Each hooked portion includes a sloping part 72 and a second part 71 which is substantially perpendicular to an intermediate portion 73 of the fixing element 7 and which has an enlarged part 711 at least wider than the gaps 305.

The fixing element 7 is shaped such that the outer wall 61 is diametrically held between both hooked portions of the fixing element 7 and there is space left between the intermediate portion 73 of the fixing element 7 and the bottom of the outer wall 61 when the fixing element 7 is mounted to the grinding mechanism 6. Each second part 71 of the fixing element 7 has an upper end 712 received in a respective one of the gaps 305, while each enlarged part 711 is abutted against the outward annular flange 304 adjacent to a respective one of the gaps 305 when the fixing element 7 is mounted to the grinding mechanism 6.

In combination, the grinding mechanism 6 is passed into the cavity 52 and then the fixing element 7 is mounted onto the grinding mechanism 6 from the bottom of the mechanism 6 with the upper ends 712 of the fixing element 7 received in the gaps 305 and with the enlarged parts 711 abutted against the outward annular flange 304. And furthermore, lower ends of the sloping parts 72 firmly abut against the cavity 52 of the housing element 5 to secure the fixing element 7 to the housing element 5. Thus, the outer wall 61 of the grinding mechanism 6 is firmly fixed to the housing element 5.

An upper threaded part of the rod 302 is combined with a cover 10 and a nut 101. The cover 10 has a lever same as that of the prior art pepper grinder recited in the BACKGROUND. Use of the pepper grinder with the improved fixing element 7 of this invention is also the same as that of the prior art pepper grinder recited in the BACKGROUND and is not specified here since it is not claimed subject matter of the present invention.

Figures 4, 6:
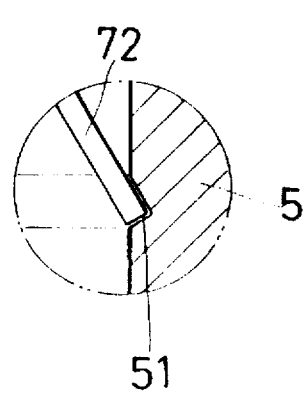
FIG. 4 is a view showing joint between the fixing element of the present invention and the housing element without recessed parts.
FIG. 6 is a view showing joint between the fixing element of the present invention and the housing element with recessed parts.
Figure 5:
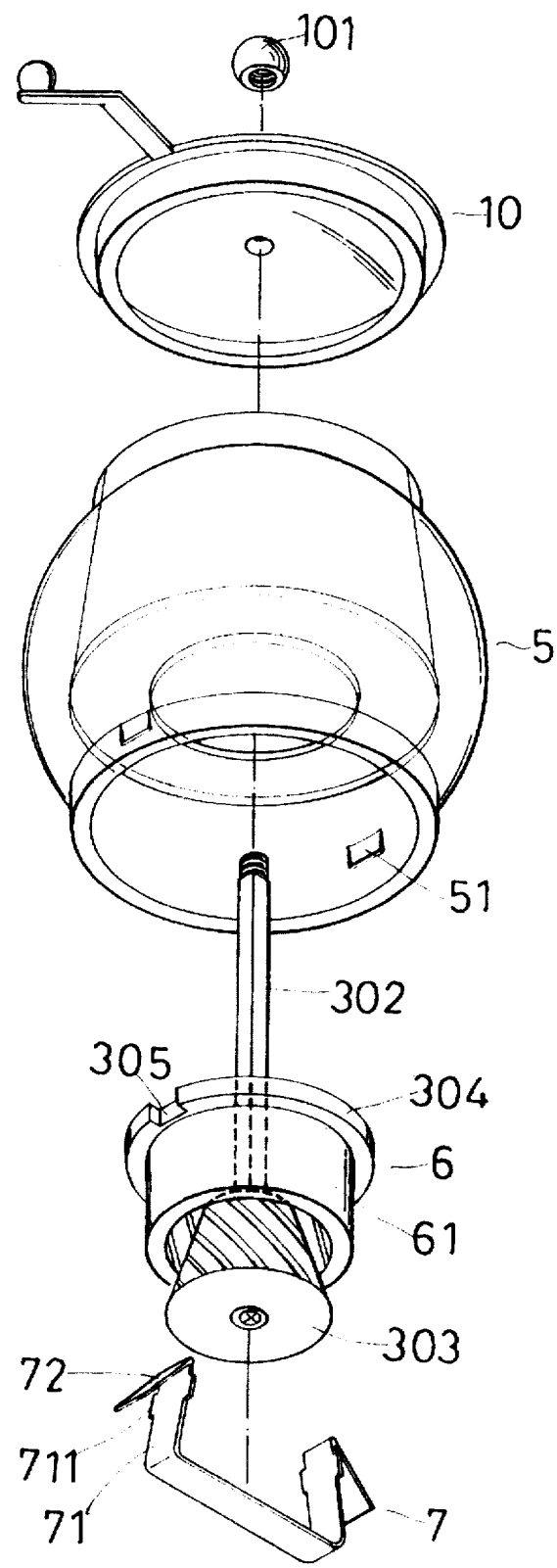
FIG. 5 is an exploded view of a pepper grinder with an improved fixing element according to the second embodiment of the invention.
Figure 7:
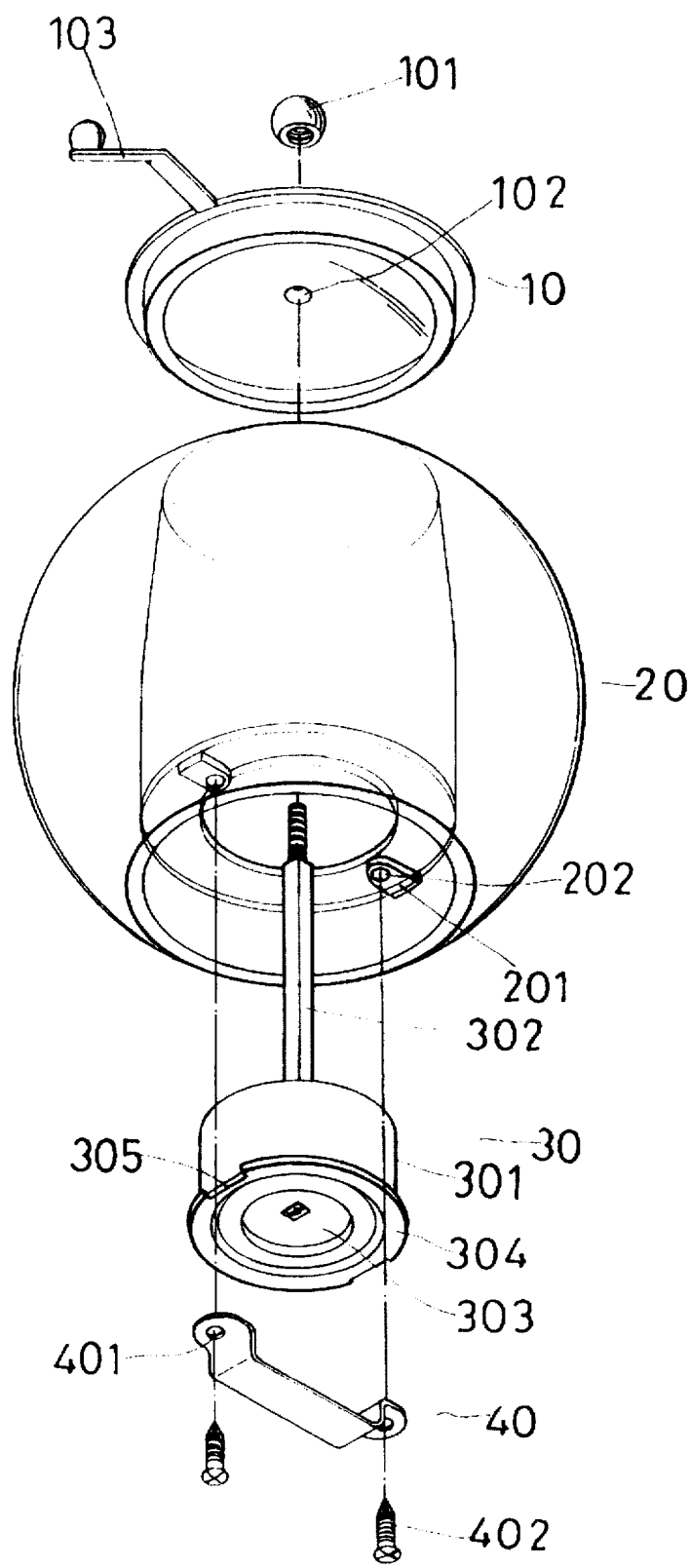
FIG. 7 is an exploded view of a pepper grinder with a common fixing element.
Figure 8:
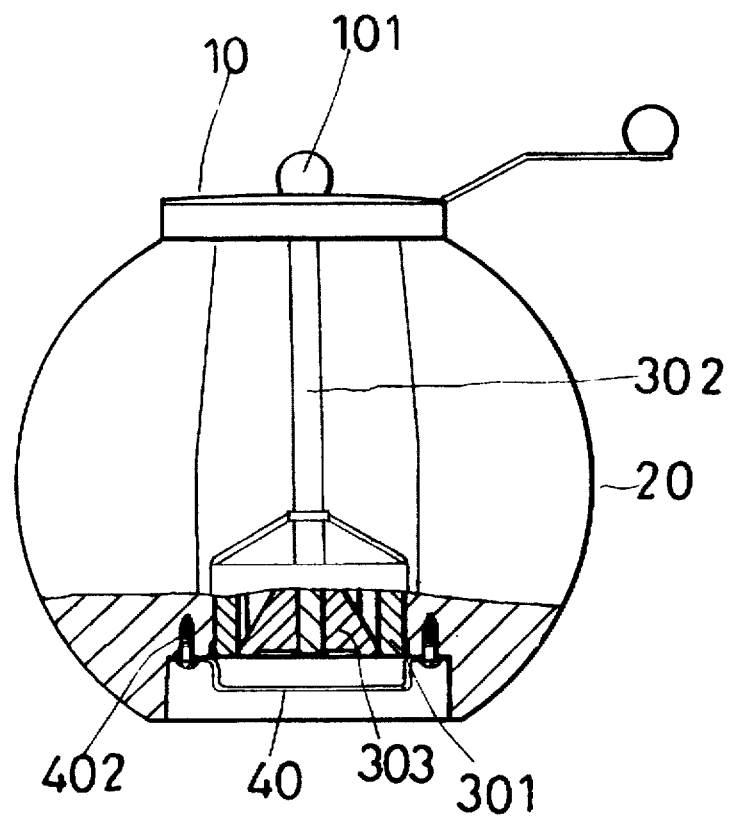
FIG. 8 is a cross-sectional view of a pepper grinder with a common fixing element; and, FIG. 9 is a bottom view of a pepper grinder with a common fixing element.
Figure 9:
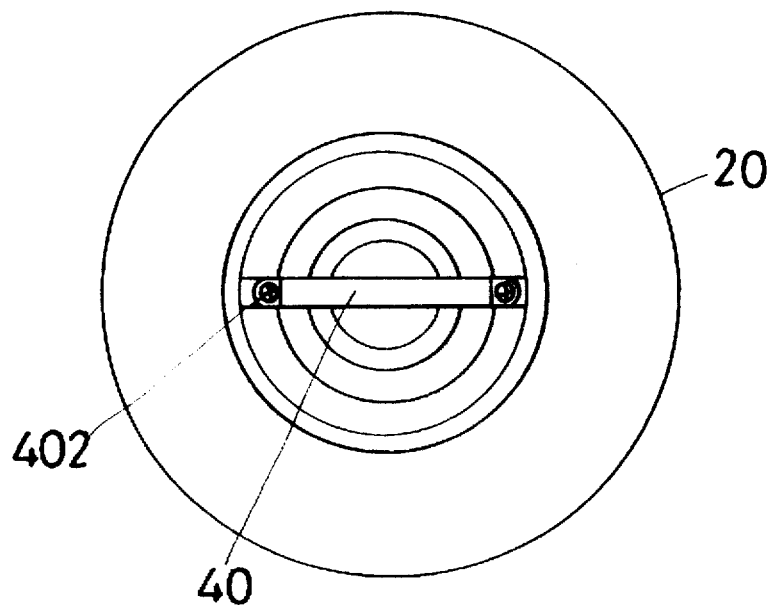

In a second embodiment, referring to FIG. 6, the cavity 52 of the housing element 5 is provided with two recessed parts 51 such that the sloping parts 72 of the fixing element 7 can snap into the recessed parts 51 and are thus secured still more firmly.

From the above said, it can be understood that the subject fixing element for the pepper grinder has following advantages.

1. The mounting of the subject fixing element is more time-saving than that of the prior art fixing element.

2. The risk of the housing element getting broken or damaged is greatly reduced in terms of what would happen to the pepper grinder with the prior art fixing element.

While the preferred embodiments of the invention have been described above, it will be recognized and understood that various modifications may be made therein and the appended claims are intended to cover all such modifications which may fall within the spirit and scope of the invention.

What is claimed is:

1. An improvement in a pepper grinder comprising:

a housing element having a central cavity and an inward annular flange in the central cavity;

a grinding mechanism housed inside the housing element, the grinding mechanism having an outer wall and a swiveling element movably received within the outer wall, the swiveling element being rotated relative to the outer wall in order to grind pepper between the swiveling element and the outer wall, the outer wall having an outward annular flange with two opposing gaps, the swiveling element being firmly connected with a rod having a distal threaded end;

a cover having a lever, the cover and a nut being connected to the distal threaded end of the rod, the rod being rotated when the cover is swiveled by means of rotating the lever, position of the swiveling element relative to the outer wall being able to be changed by the nut in order to adjust fineness of ground pepper;

said improvement comprising a fixing element having two opposing hooked portions each having a sloping part and a second part, the second parts being substantially perpendicular to an intermediate portion defined by both second parts, each second part having an enlarged part at least wider than the gaps of the grinding mechanism, each sloping part extending from a top end of a respective one of the second parts and extending outward of said respective second part;

the fixing element being fixed to the housing element with upper ends of the second parts being received in the gaps and the enlarged parts firmly abutting the outward annular flange of the outer wall and with lower ends of the sloping parts abutting a wall of the cavity whereby fixing the outer wall to the housing element, the fixing element being shaped such that a space is provided between the intermediate portion thereof and a bottom of the outer wall for the swiveling element to be moved within the space.

2. The improvement in the pepper grinder as recited in claim 1 further comprising two recessed parts on the wall of the central cavity to firmly receive the lower ends of the sloping parts of the fixing element.

\* \* \* \* \*